United States Patent
Lee et al.

(10) Patent No.: US 10,059,173 B2
(45) Date of Patent: Aug. 28, 2018

(54) AIR CONDITIONER SYSTEM FOR VEHICLE

(71) Applicant: HANON SYSTEMS, Daejeon (KR)

(72) Inventors: Hae Jun Lee, Daejeon (KR); Yong Nam Ahn, Daejeon (KR); Jun Young Choi, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 41 days.

(21) Appl. No.: 15/103,933

(22) PCT Filed: Jan. 21, 2015

(86) PCT No.: PCT/KR2015/000629
§ 371 (c)(1),
(2) Date: Jun. 13, 2016

(87) PCT Pub. No.: WO2015/111913
PCT Pub. Date: Jul. 30, 2015

(65) Prior Publication Data
US 2016/0332508 A1 Nov. 17, 2016

(30) Foreign Application Priority Data

Jan. 22, 2014 (KR) .................. 10-2014-0007515
Jan. 22, 2014 (KR) .................. 10-2014-0007518

(51) Int. Cl.
*B60H 1/00* (2006.01)
*B60H 1/32* (2006.01)

(52) U.S. Cl.
CPC .......... *B60H 1/323* (2013.01); *B60H 1/00335* (2013.01); *B60H 1/00342* (2013.01);
(Continued)

(58) Field of Classification Search
CPC ............ B60H 1/00328; B60H 1/00335; B60H 1/00342; B60H 1/3227; B60H 1/323;
(Continued)

(56) References Cited

U.S. PATENT DOCUMENTS 3,606,762 A * 9/1971 Anglin ................. B60H 1/3204
62/239
3,812,687 A * 5/1974 Stolz ......................... F25B 1/00
62/244

(Continued)

FOREIGN PATENT DOCUMENTS

JP 2005153712 A 6/2005
JP 2008057950 A 3/2008
(Continued)

OTHER PUBLICATIONS

International Search Report dated Apr. 28, 2015 from International Patent Application Serial No. PCT/KR2015/000629.

*Primary Examiner* — Marc Norman
(74) *Attorney, Agent, or Firm* — Dickinson Wright PLLC

(57) ABSTRACT

The present invention relates to an air conditioner system for a vehicle includes an air-cooled condenser mounted between a water-cooled condenser and an expansion valve to exchange heat of refrigerant discharged from the water-cooled condenser with air in order to further cool the refrigerant even though temperature of the refrigerant rises due to temperature rise of coolant supplied to the water-cooled condenser, thereby enhancing cooling performance because the refrigerant flows into an internal heat exchanger due to a drop in temperature of the refrigerant, preventing a temperature rise of the refrigerant discharged from the compressor because temperature of the refrigerant flowing into the compressor drops, and enhancing durability and stability of the air conditioner system.

14 Claims, 10 Drawing Sheets

(52) U.S. Cl.
CPC ..... *B60H 1/00521* (2013.01); *B60H 1/00564* (2013.01); *B60H 1/00671* (2013.01); *B60H 1/3227* (2013.01); *B60H 2001/3266* (2013.01); *B60H 2001/3277* (2013.01); *B60H 2001/3291* (2013.01)

(58) Field of Classification Search
CPC ........ F25B 2313/025; F25B 2313/0254; F25B 2313/02541
USPC .......................................................... 62/513
See application file for complete search history.

(56) References Cited

U.S. PATENT DOCUMENTS

| | | | | |
|---|---|---|---|---|
| 8,037,698 B2* | 10/2011 | Heckt | .................... | B60H 1/005 62/114 |
| 2006/0213220 A1* | 9/2006 | Takahashi | ............ | B60H 1/3227 62/503 |
| 2007/0012070 A1* | 1/2007 | Vetter | ................ | B60H 1/00585 62/503 |

FOREIGN PATENT DOCUMENTS

| | | | |
|---|---|---|---|
| JP | 2010173357 | A | 8/2010 |
| KR | 2010062925 | A | 6/2010 |
| KR | 20130021143 | A | 3/2013 |
| WO | WO2012153409 | A1 | 11/2012 |

\* cited by examiner

Prior art

AIR CONDITIONER SYSTEM FOR VEHICLE

CROSS-REFERENCE TO RELATED APPLICATIONS

This application is a U.S. National Stage of International Application No. PCT/KR2015/000629, filed Jan. 21, 2015, which claims the benefit and priority of KR 10-2014-0007515 filed Jan. 22, 2014 and KR 10-2014-0007518 filed Jan. 22, 2014. The entire disclosures of each of the above applications are incorporated herein by reference.

TECHNICAL FIELD

The present invention relates to an air conditioner system for a vehicle, and more particularly, to an air conditioner system for a vehicle which includes an air-cooled condenser mounted between a water-cooled condenser and an expansion valve to exchange heat of refrigerant discharged from the water-cooled condenser with air in order to further cool the refrigerant even though temperature of the refrigerant rises due to temperature rise of coolant supplied to the water-cooled condenser.

BACKGROUND ART

In general, as shown in FIG. 1, an air conditioner system for a vehicle has a refrigeration cycle that includes: a compressor 1 for compressing and discharging refrigerant; a condenser 2 for condensing the refrigerant of high pressure discharged from the compressor 1; an expansion valve 3 for throttling the refrigerant condensed and liquefied in the condenser 2; and an evaporator 4 for exchanging heat between the liquefied refrigerant of low pressure throttled by the expansion valve 3 and air blown to the interior of the vehicle and evaporating the refrigerant to cool the air discharged to the interior of the vehicle due to heat absorption by evaporative latent heat, and that the compressor 1, the condenser 2, the expansion valve 3 and the evaporator 4 are connected with each other via refrigeration pipes. The air conditioner system cools the interior of the vehicle through the following refrigerant circulation process.

When a cooling switch (not shown) of the air conditioner system is turned on, first, the compressor 1 inhales and compresses gas-phase refrigerant of low-temperature and low-pressure while driving by driving power of an engine or a motor, and then sends the refrigerant in the gaseous phase of high-temperature and high-pressure to the condenser 2. Then, the condenser 2 condenses the gas-phase refrigerant into liquid-phase refrigerant of high-temperature and high-pressure by exchanging heat with outdoor air. After that, the liquid-phase refrigerant of high-temperature and high-pressure sent from the condenser 2 rapidly expands by a throttling action of the expansion valve 3 and is sent to the evaporator 4 in a wet-saturated state of low-temperature and low-pressure. The evaporator 4 exchanges heat between the refrigerant and air blown to the interior of the vehicle by a blower (not shown). Then, the refrigerant is evaporated in the evaporator 4 and discharged in a gaseous phase of low-temperature and low-pressure. After that, the gas-phase refrigerant is inhaled into the compressor 1, and then, recirculates the refrigeration cycle as described above.

In the refrigerant circulation process, as described above, the air blown by the blower (not shown) is cooled by evaporative latent heat of the liquid-phase refrigerant circulating inside the evaporator 4 and discharged to the interior of the vehicle in a cooled state so as to cool the interior of the vehicle.

Recently, in order to enhance cooling performance, a water-cooled condenser 20 and an internal heat exchanger 25 are applied to an air conditioner system. Referring to FIG. 2, the water-cooled condenser 20 heat-exchanges the refrigerant discharged to the compressor 1 with coolant to condense the refrigerant.

That is, coolant circulating inside a water-cooled radiator 50 mounted in an engine room of the vehicle is supplied into the water-cooled condenser 20 and exchanges heat with the gas-phase refrigerant discharged from the compressor 1, so that the gas-phase refrigerant is cooled and condensed to be changed into a liquid-phase refrigerant.

Moreover, the internal heat exchanger 25 which exchanges heat between the refrigerant discharged from the water-cooled condenser 20 and the refrigerant discharged from the evaporator 4 is mounted.

Therefore, the refrigerant discharged from the water-cooled condenser 20 enhances cooling performance through supercooling because being further cooled in the internal heat exchanger 25 and flowing to the expansion valve 3.

However, in the conventional air conditioner system, when the vehicle idles or when the outdoor temperature rises, temperature of the coolant passing the water-cooled radiator 50 also rises. In this instance, when temperature of the coolant rises, temperature of the refrigerant of the water-cooled condenser 20 which exchanges heat with coolant also rises. Thus, the refrigerant flows into the internal heat exchanger 25, and then, flows into the expansion valve 3 and the evaporator 4 to cause deterioration in cooling performance.

Furthermore, the refrigerant discharged from the evaporator 4 flows into the internal heat exchanger 25, and then, flows into the compressor 1 after exchanging heat with the refrigerant with elevated temperature. Thus, temperature of the discharged refrigerant of the compressor 1 rises above an upper limit, so that durability and stability of the air conditioner system are deteriorated, for instance, the refrigerant leaks or lifespan of the air conditioner system decreases.

Referring to FIG. 13, you can see that temperature of the refrigerant discharged from the compressor 1 rose above the limit, and temperature of the refrigerant which flew into the compressor 1 and temperature of the refrigerant which was discharged from the water-cooled condenser 20 also rose higher than temperature of the present invention.

DISCLOSURE

Technical Problem

Accordingly, the present invention has been made in an effort to solve the above-mentioned problems occurring in the prior arts, and it is an object of the present invention to provide an air conditioner system for a vehicle which includes an air-cooled condenser mounted between a water-cooled condenser and an expansion valve to exchange heat of refrigerant discharged from the water-cooled condenser with air in order to further cool the refrigerant even though temperature of the refrigerant rises due to temperature rise of coolant supplied to the water-cooled condenser, thereby enhancing cooling performance because the refrigerant flows into an internal heat exchanger due to a drop in temperature of the refrigerant, preventing a temperature rise of the refrigerant discharged from the compressor because temperature of the refrigerant flowing into the compressor drops, and enhancing durability and stability of the air conditioner system.

Technical Solution

To achieve the above objects, the present invention provides an air conditioner system for a vehicle which includes: a compressor; a water-cooled condenser for condensing refrigerant, which is compressed in and discharged from the compressor, by exchanging heat with coolant; an expansion valve adapted for expanding the refrigerant discharged from the water-cooled condenser; an evaporator for evaporating the refrigerant discharged from the expansion valve; a refrigeration pipe for connecting the compressor, the water-cooled condenser, the expansion valve and the evaporator with one another in order; and an air-cooled condenser which is mounted between the water-cooled condenser and the expansion valve in order to further cool the refrigerant by exchanging heat between the refrigerant discharged from the water-cooled condenser with air.

Advantageous Effects

According to the present invention, the air conditioner system for a vehicle includes the air-cooled condenser mounted between the water-cooled condenser and the expansion valve to exchange heat between refrigerant discharged from the water-cooled condenser and air in order to further cool the refrigerant even though temperature of the refrigerant rises due to temperature rise of coolant supplied to the water-cooled condenser, thereby enhancing cooling performance because the refrigerant flows into an internal heat exchanger due to a drop in temperature of the refrigerant.

Moreover, the air conditioner system according to the present invention operates air supply means in a condition that traveling wind is reduced like vehicle idling and supplies cold interior air to the air-cooled condenser to cool the refrigerant, thereby enhancing cooling performance due to a drop in temperature of the refrigerant.

Furthermore, the air conditioner system according to the present invention further cools the refrigerant through the air-cooled condenser as well as the water-cooled condenser and supplies cold interior air to the air-cooled condenser through the air supply means to further lower temperature of the refrigerant, thereby preventing a temperature rise of the refrigerant discharged from the compressor because temperature of the refrigerant flowing into the compressor drops and enhancing durability and stability of the air conditioner system.

Additionally, the air conditioner system according to the present invention operates the air supply means in the condition that the vehicle idles or traveling wind is reduced to supply cold interior air to the air-cooled condenser, thereby making stable air supply possible and securing uniform refrigerant cooling performance.

MODE FOR INVENTION

Figure 1:
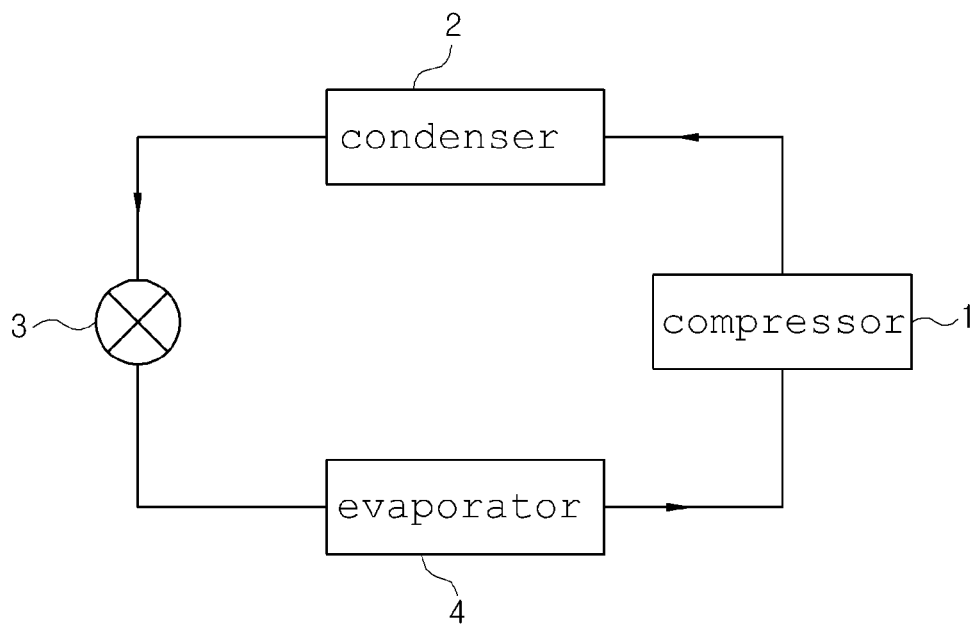
FIG. 1 is a configurative diagram of a general air conditioner system for a vehicle.
Figure 2:
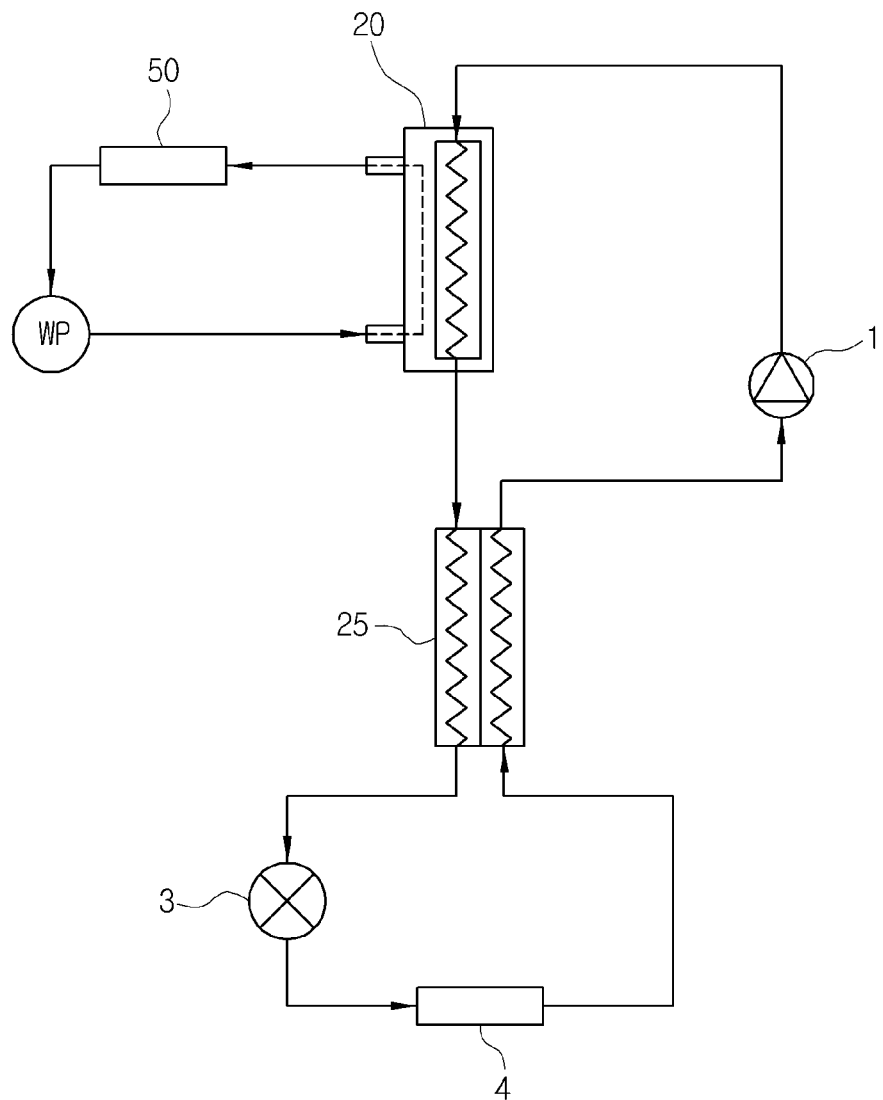
FIG. 2 is a configurative diagram showing a state where a water-cooled condenser and an internal heat exchanger are applied to a conventional air conditioner system for a vehicle.
Figure 3:
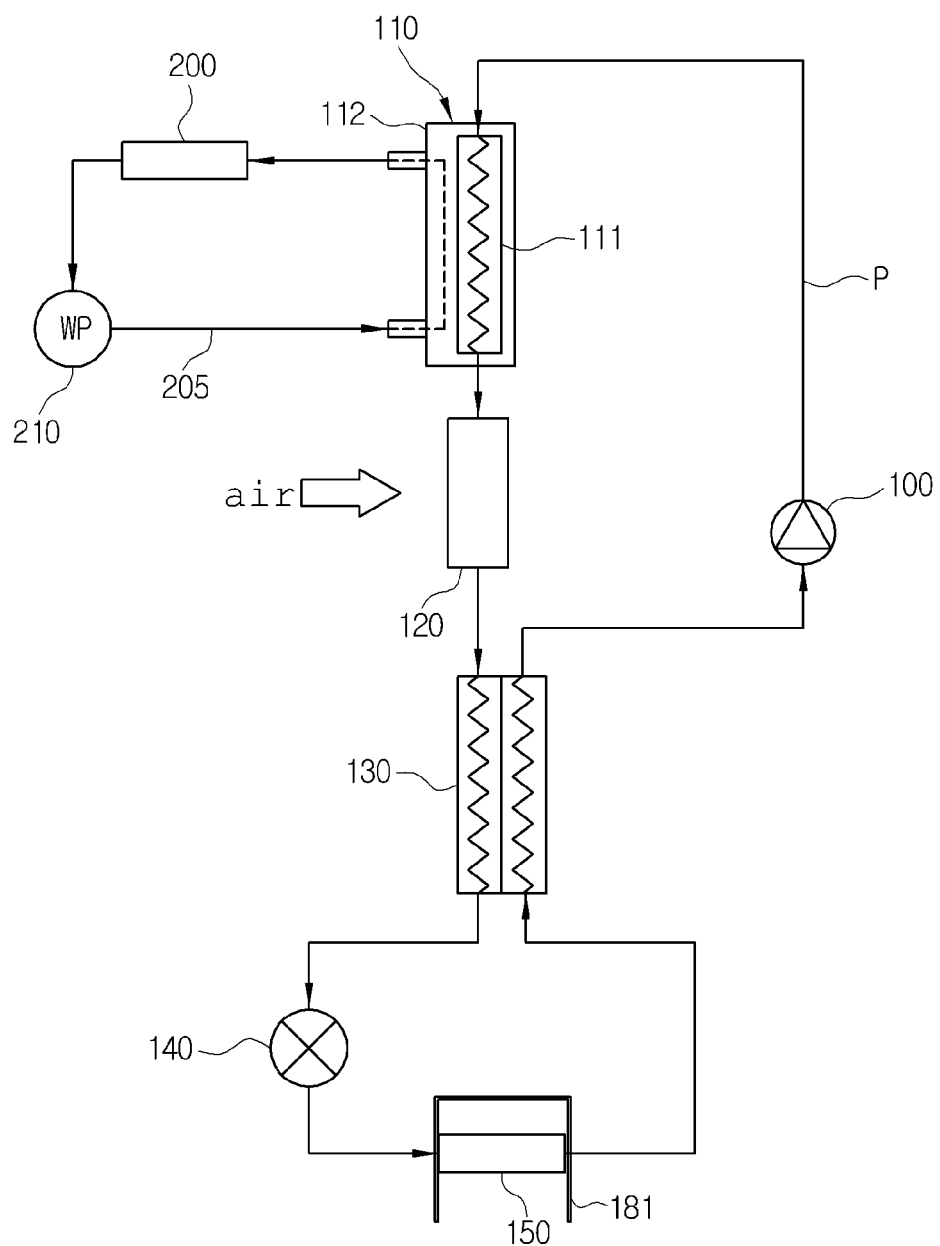
FIG. 3 is a configurative diagram of an air conditioner system for a vehicle according to a preferred embodiment of the present invention.

Reference will be now made in detail to the preferred embodiment of the present invention with reference to the attached drawings.

As shown in the drawings, an air-conditioner system for a vehicle according to a preferred embodiment of the present invention is configured of a compressor 100, a water-cooled condenser 110, an expansion valve 140 and an evaporator 150 which are connected to a refrigerant pipe P in order, and includes an air-cooled condenser 120 and an internal heat exchanger 130 mounted in the above-mentioned system.

First, the compressor 100 inhales and compresses gas-phase refrigerant of low-temperature and low-pressure discharged from the evaporator 150 and discharges the gas-phase refrigerant into a gaseous state of high-temperature and high-pressure while receiving a driving power from a driving power supply source, such as, an engine or a motor.

The water-cooled condenser 110 heat-exchanges the gas-phase refrigerant of high-temperature and high-pressure discharged from the compressor 100 with coolant, and then, condenses into liquid-phase refrigerant and discharges the condensed refrigerant.

The water-cooled condenser 110 includes: a refrigerant heat-exchanging part 111 in which the refrigerant discharged from the compressor 100 flows; and a coolant heat-exchanging part 112 in which coolant circulating a water-cooled radiator 200 mounted inside a vehicle engine room flows, and the refrigerant heat-exchanging part 111 and the coolant heat-exchanging part 112 are configured to be able to exchange heat with each other.

In the meantime, the water-cooled condenser 110 may have one of various well-known forms.

Figure 4:
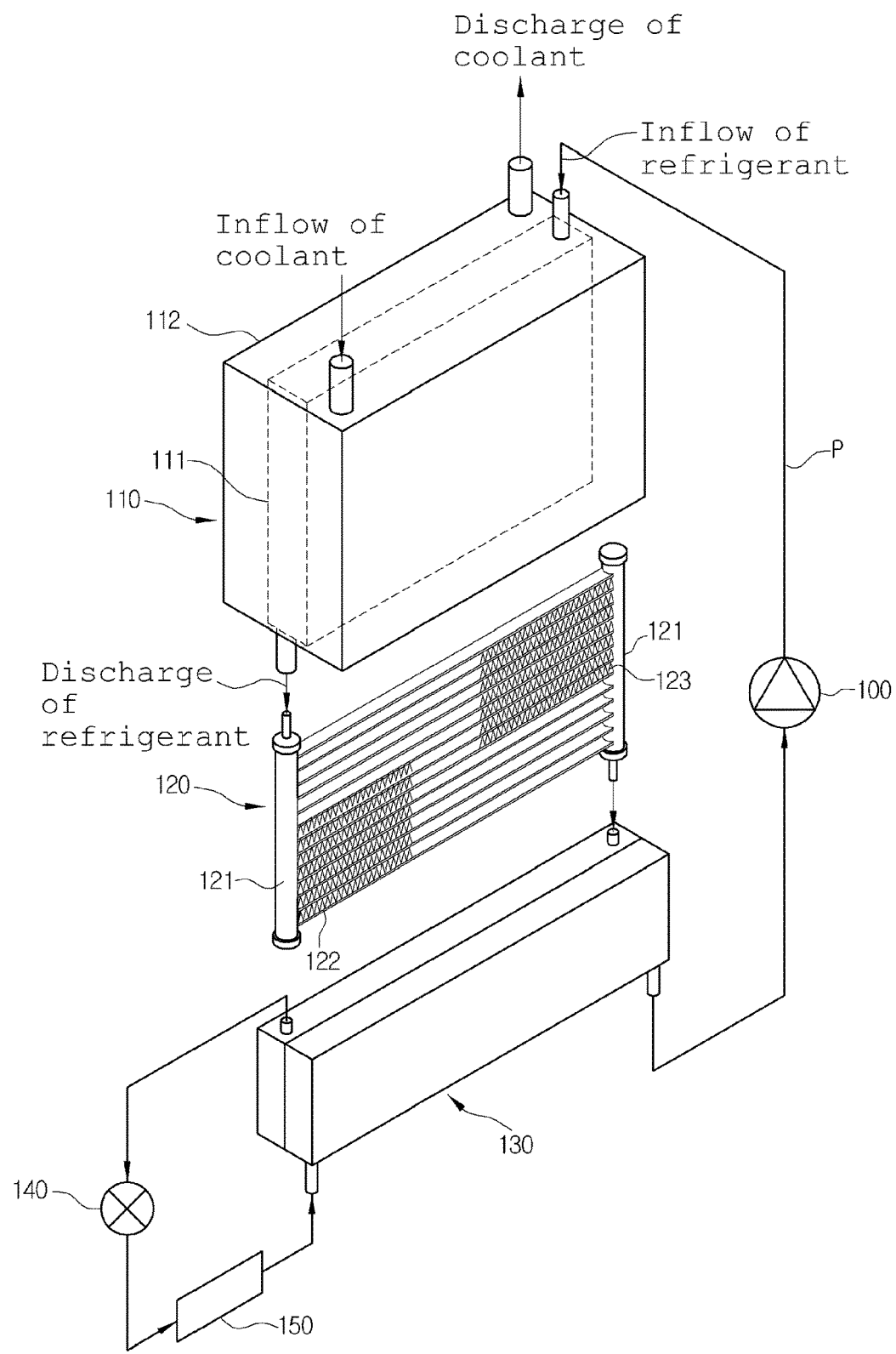
FIG. 4 is a perspective view showing a water-cooled condenser, an air-cooled condenser and an internal heat exchanger in the air conditioner system according to the present invention.
Figure 5:
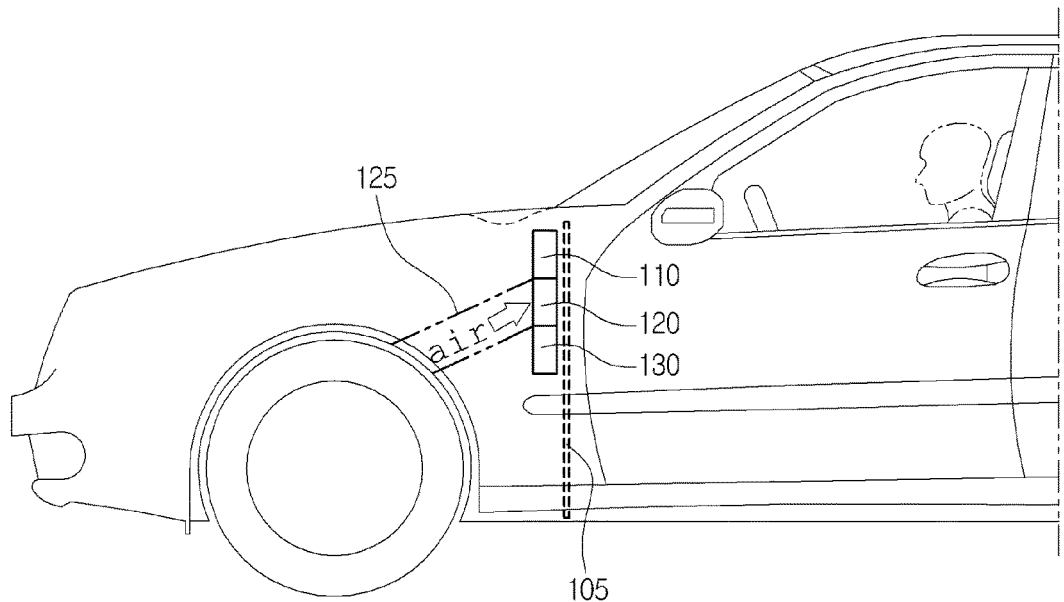
FIGS. 5 and 6 are schematic diagrams showing a state where the water-cooled condenser, the air-cooled condenser and the internal heat exchanger are mounted in the air conditioner system according to the present invention.
Figure 6:
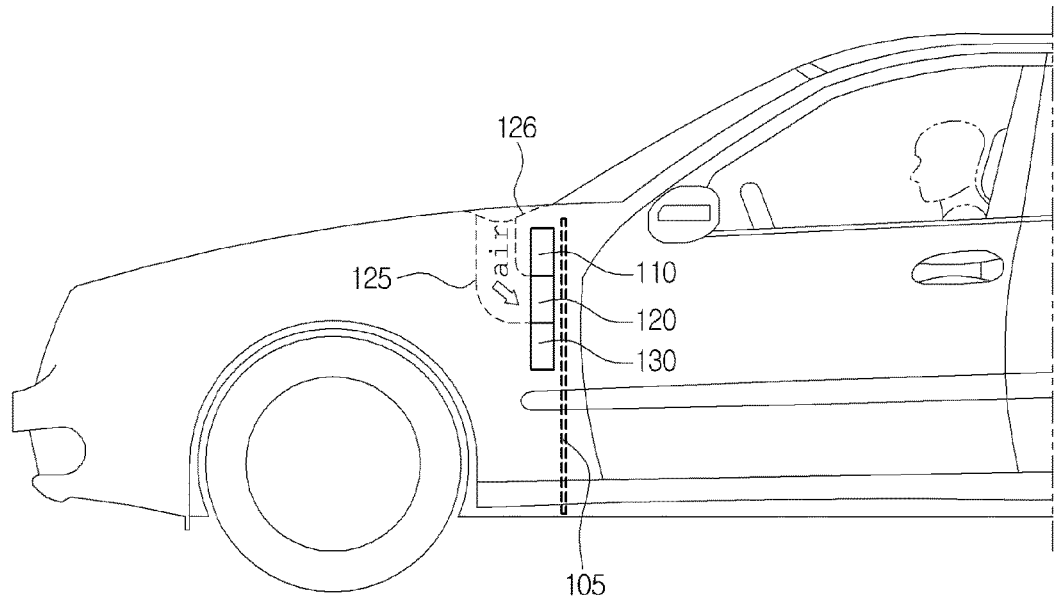
Figure 7:
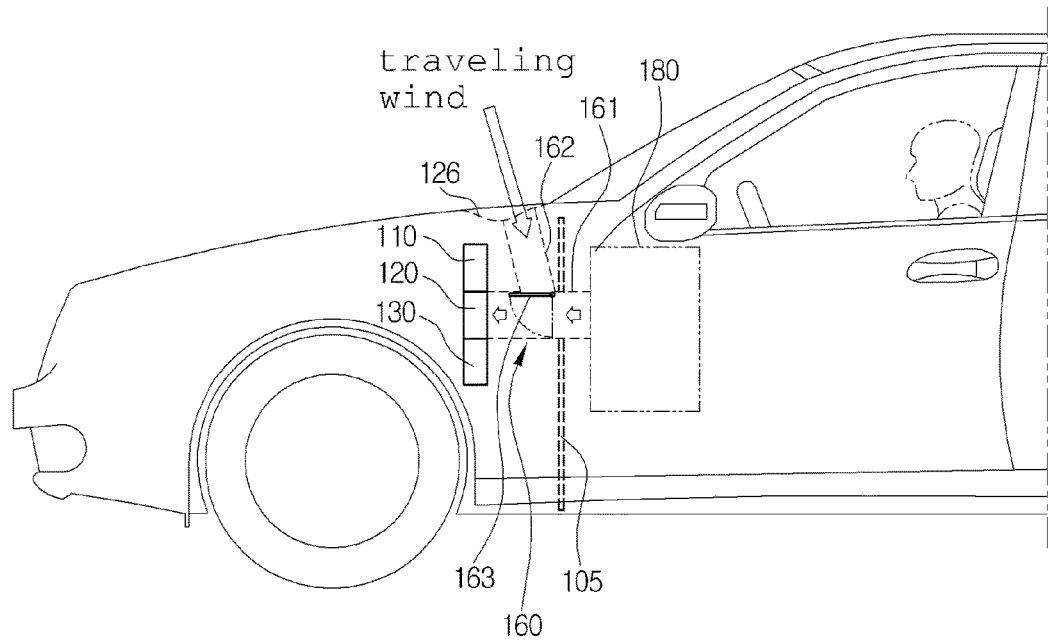
FIG. 7 is a schematic diagram showing a state where air supply means for the air conditioner system according to the present invention is mounted in the vehicle.
Figure 8:
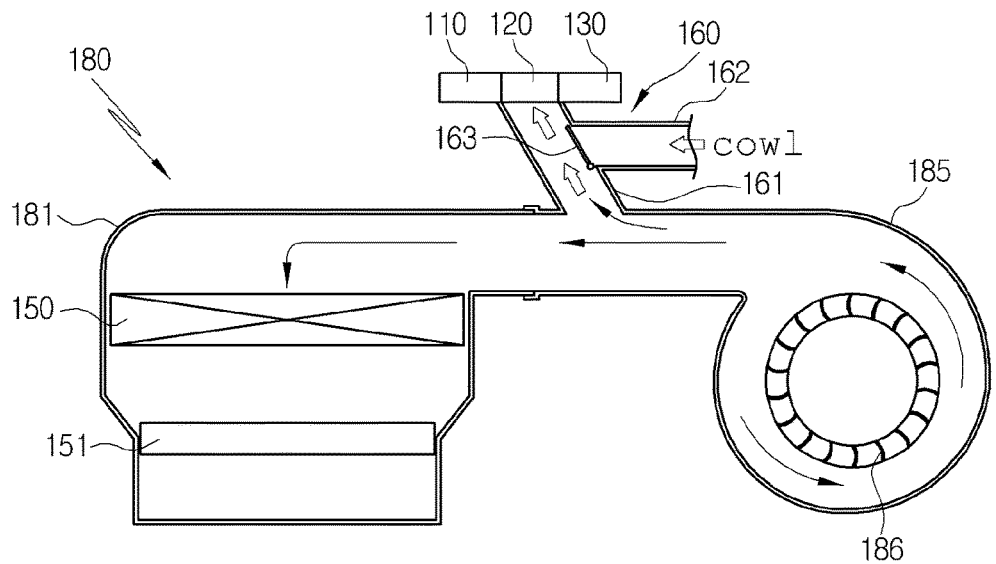
FIG. 8 is a plan view showing a state where air inside an air blast case is supplied to the air-cooled condenser through an air supplier of FIG. 7.
Figure 9:
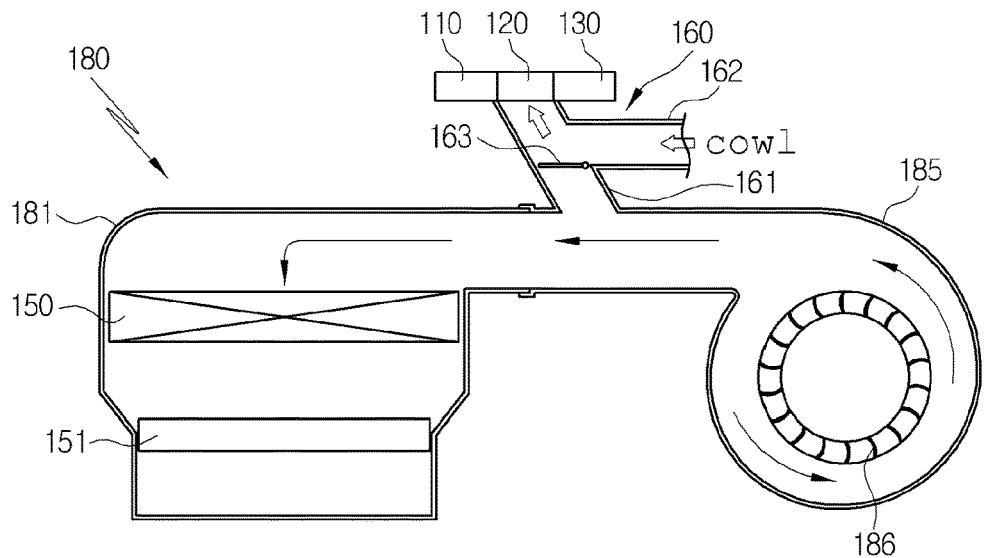
FIG. 9 is a plan view showing a state where traveling wind blown into a cowl is supplied to the air-cooled condenser through the air supplier of FIG. 7.
Figure 10:
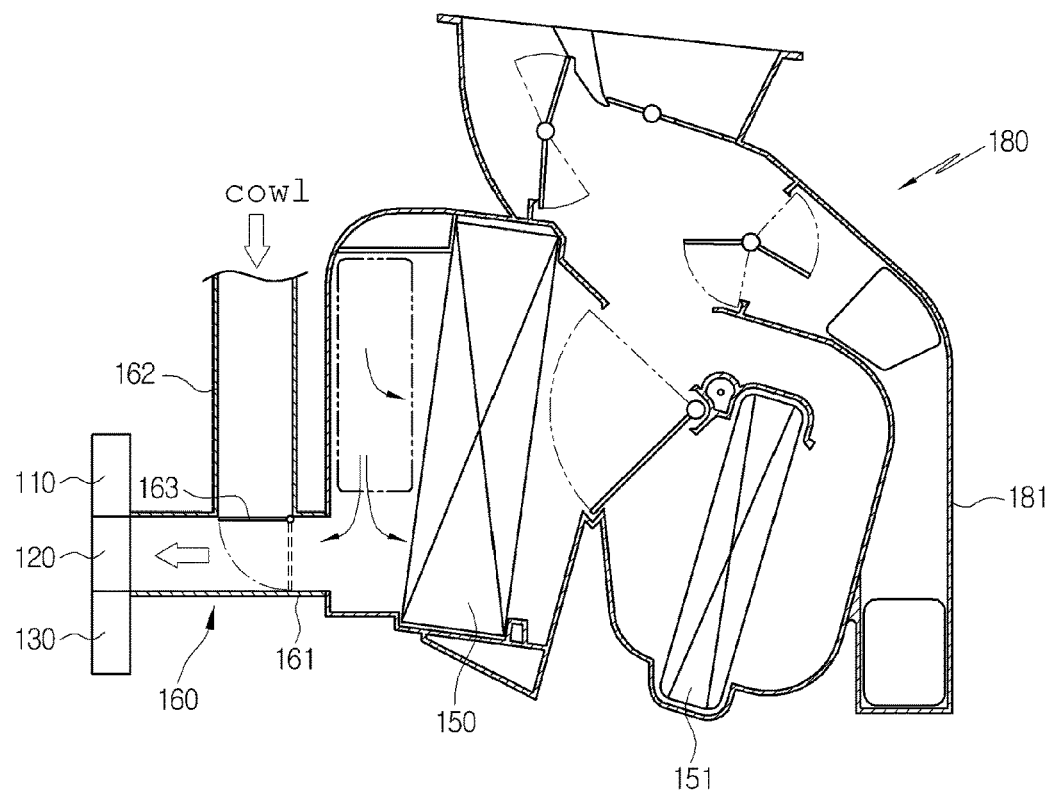
FIG. 10 is a plan view showing a state where air inside an air-conditioning case of the upstream side of an evaporator is supplied to the air-cooled condenser through the air supplier of FIG. 7.

For example, as shown in FIG. 4, the water-cooled condenser 110 may be configured such that the coolant heat-exchanging part 112 is formed in a tank type and the refrigerant heat-exchanging part 111 is inserted into the coolant heat-exchanging part 112 to be able to exchange heat with each other.

Alternatively, the water-cooled condenser 110 may be a plate type heat exchanger (not shown) in which tubes (not shown) of the coolant heat-exchanging part 112 and tubes (not shown) of the refrigerant heat-exchanging part 111 are stacked by turns.

The water-cooled radiator 200 is connected with the coolant heat-exchanging part 112 through a coolant pipe 205, and a water pump 210 for circulating the coolant is mounted on the coolant pipe 205.

Therefore, when the water pump 210 is operated, the coolant circulating in the coolant pipe 205 is cooled by heat exchange with air while passing through the water-cooled radiator 200, and then, the cooled coolant is supplied to the coolant heat-exchanging part 112 to exchange heat with the refrigerant flowing in the refrigerant heat-exchanging part 111.

In the meantime, the water-cooled radiator 200 is mainly used to cool electronic units of the vehicle.

Moreover, the expansion valve 140 rapidly expands the liquid-phase refrigerant discharged from the water-cooled condenser 110 by the throttling action and sends the refrigerant to the evaporator 150 in a wet-saturated state of low-temperature and low-pressure.

Of course, in the present invention, the liquid-phase refrigerant which passes the water-cooled condenser 110, the air-cooled condenser 120 and the internal heat exchanger 130 in order is supplied to the expansion valve 140.

The evaporator 150 evaporates the liquid-phase refrigerant of low-pressure throttled in the expansion valve 140 by heat-exchanging with the air, which is blown to the interior of the vehicle, inside an air-conditioning case 181 so that the air discharged to the interior of the vehicle is cooled due to heat absorption by evaporative latent heat of the refrigerant.

Continuously, the gas-phase refrigerant of low-temperature and low-pressure evaporated and discharged in the evaporator 150 is inhaled to the compressor 100 again, and then, recirculates the refrigerant cycle as described above.

Furthermore, in the refrigerant circulation process, the air blown by a blower (not shown) flows into the air-conditioning case 181, and is cooled by evaporative latent heat of the liquid-phase refrigerant circulating the inside of the evaporator 150 while passing the evaporator 150. Therefore, the interior of the vehicle is cooled when the refrigerant in the cooled state is discharged to the interior of the vehicle.

Additionally, the air-cooled condenser 120 for further cooling the refrigerant by heat-exchanging the refrigerant discharged from the water-cooled condenser 110 with air is mounted between the water-cooled condenser 110 and the expansion valve 140.

That is, the air-cooled condenser 120 is connected at an outlet of the water-cooled condenser 110, and exchanges heat between the refrigerant, which is discharged from the water-cooled condenser 110 and flows in the air-cooled condenser 120, and the air passing the air-cooled condenser 120.

Such an air-cooled condenser 120 includes: a pair of header tanks 121 which are spaced apart from each other at a predetermined interval and mounted side by side with each other; a plurality of tubes 122 whose both ends are joined to the header tanks 121 to make the header tanks 121 communicate with each other; and radiation fins 123 interposed among the tubes 122.

Therefore, the refrigerant flowing into one header tank 121 of the air-cooled condenser 120 is further cooled by heat exchange with the air passing among the tubes 122 while flowing along the tubes 122, so as to be supercooled.

Meanwhile, when the vehicle idles or when the outdoor temperature rises, temperature of the coolant passing the water-cooled radiator 200 also rises. The coolant with elevated temperature is supplied to the water-cooled condenser 110 so that temperature of the refrigerant flowing in the water-cooled condenser 110 rises.

In the present invention, the air-cooled condenser 120 is mounted at the outlet of the water-cooled condenser 110 in order to further cool the refrigerant by the air-cooled condenser 120 even though temperature of the refrigerant flowing in the water-cooled condenser 110 rises. Because temperature of the refrigerant lowers further, the refrigerant can flow into the internal heat exchanger 130 to enhance cooling performance. Consequentially, because temperature of the refrigerant flowing into the compressor 100 also drops, the air conditioner system according to the present invention can prevent a temperature rise of the refrigerant discharged from the compressor 100 and enhance durability and stability of the system.

Figure 13:
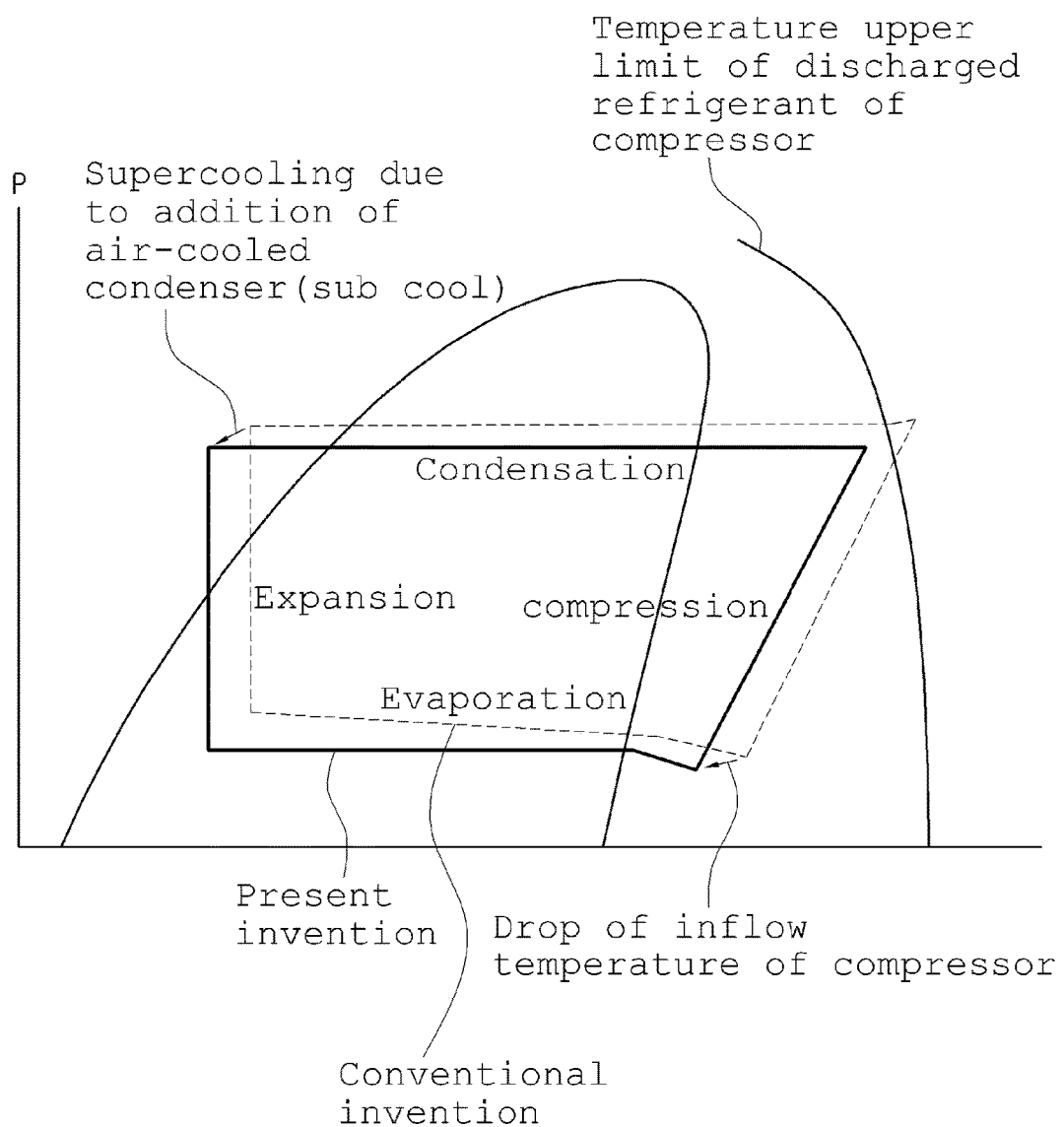
FIG. 13 is a Mollier chart of the air conditioner system according to the present invention and the conventional air conditioner system.

FIG. 13 is a Mollier chart of the air conditioner system according to the present invention and the conventional air conditioner system. As shown in the drawing, in the conventional air conditioner system, if temperature of the coolant circulating the water-cooled radiator 50 rises, temperature of the refrigerant of the water-cooled condenser also rises, thus, refrigerant temperature of an outlet side of the water-cooled condenser 20 rises and refrigerant temperature of an inlet side of the compressor 1 also rises. Especially, the temperature of the refrigerant discharged from the compressor 1 rises above the upper limit, and it causes deterioration in durability and stability of the air conditioner system.

In the air conditioner system according to the present invention, even though temperature of the coolant circulating the water-cooled radiator 200 rises and temperature of the refrigerant of the water-cooled condenser 110 rises, because the air-cooled condenser 120 further cools the refrigerant to be supercooled, as shown in FIG. 13, refrigerant temperature of the outlet side of the water-cooled condenser 110 and refrigerant temperature of an inlet side of the compressor 100 are lower than those of the conventional air conditioner system. Particularly, because temperature of the refrigerant discharged from the compressor 100 does not exceed the upper limit, the air conditioner system according to the present invention can enhance durability and stability of the system. In addition, the internal heat exchanger 130 for exchanging heat between the refrigerant discharged from the air-cooled condenser 120 and the refrigerant discharged from the evaporator 150 is mounted between the air-cooled condenser 120 and the expansion valve 140.

The internal heat exchanger 130 is a heat exchanger for refrigerant-to-refrigerant heat exchange. FIG. 4 is a schematic diagram of the internal heat exchanger 130, and the internal heat exchanger 130 may be a plate type heat exchanger or a dual tube type heat exchanger.

Therefore, the refrigerant passing the air-cooled condenser 120 exchanges heat with the refrigerant, which is discharged from the evaporator 150 and flows in the internal heat exchanger 130, while flowing in the internal heat exchanger 130, so as to be supercooled more. After that, the refrigerant flows into the expansion valve 140. Then, temperature of the refrigerant lowers more, and it increases an enthalpy difference of the evaporator 150 to enhance cooling performance.

Moreover, because temperature of the refrigerant which passes the internal heat exchanger 130 and flows into the compressor 100 after being discharged from the evaporator 150 also drops, temperature of the refrigerant discharged from the compressor 100 does not exceed the upper limit.

Furthermore, the water-cooled condenser 110, the air-cooled condenser 120 and the internal heat exchanger 130 are mounted inside the vehicle engine room to be mounted adjacent to a partition wall 105 which partitions the engine room from the interior of the vehicle.

That is, the conventional condenser is mounted at the front of the engine room to exchange heat with front wind of the vehicle, but, the water-cooled condenser 110, the air-cooled condenser 120 and the internal heat exchanger 130 are mounted adjacent to the partition wall 105 which partitions the engine room from the interior of the vehicle. In this instance, the air-cooled condenser 120 cools the refrigerant using the air induced through the upper side or the lower side of the vehicle or using the air induced through a cowl 126 of the vehicle when the vehicle travels.

In this instance, a guide duct 125 for guiding air toward the air-cooled condenser 120 is mounted at the front of the air-cooled condenser 120. That is, the air induced through the upper or lower side of the engine room of the vehicle or through the cowl 126 is smoothly guided to the air-cooled condenser 120 through the guide duct 125 to increase heat-exchange performance with the refrigerant.

In the meantime, the water-cooled condenser 110, the air-cooled condenser 120 and the internal heat exchanger 130 are adjacent to the front of the partition wall 105 inside the engine room and are connected with one another in line. In other words, because the water-cooled condenser 110, the air-cooled condenser 120 and the internal heat exchanger 130 are arranged in line between the compressor 100 mounted in the engine room and the evaporator 150 mounted in the interior of the vehicle to be adjacent to one another, the air conditioner system according to the present invention can reduce a pressure loss due to a flow of the refrigerant, occupies a small installation space due to its compact-sized installation, and continues the condensation process and the supercooling process.

Next, in a case that the guide duct 125 is mounted, the air conditioner system can cool the refrigerant of the air-cooled condenser 120 using traveling wind while the vehicle travels. Furthermore, in a case that air supply means 160 or 170 is mounted additionally, the air conditioner system can supply air to the air-cooled condenser 120 to cool the refrigerant even though traveling wind is reduced.

The air supply means 160 is mounted at one side of the air-cooled condenser 120 to supply air to the air-cooled condenser 120.

That is, the air conditioner system cools the refrigerant of the air-cooled condenser 120 using traveling wind while the vehicle travels, but supplies air to the air-cooled condenser 120 through the air supply means 160 to cool the refrigerant of the air-cooled condenser 120 when traveling wind grows weaker.

The air supply means 160 includes: a first duct 161 which connects the air-cooled condenser 120 and an air conditioner 180 of the vehicle with each other to supply the air inside the air conditioner 180 to the air-cooled condenser 120; a second duct 162 which connects the first duct 161 with the exterior of the vehicle to supply outdoor air to the air-cooled condenser 120; and a door 163 which is mounted at a diverging point between the first duct 161 and the second duct 162 to open and shut the first duct 161 and the second duct 162.

Meanwhile, the air conditioner 180 includes: the air-conditioning case 181 in which the evaporator 150 and a heater core 151 are mounted; and an air blast case 185 which is connected to one side of the air-conditioning case 181 and has an air blast fan 186 for blowing air toward the air-conditioning case 181.

In this instance, an inlet of the first duct 161 is communicatingly connected with the air blast case 185 so that some of the air flowing inside the air blast case 185 can be supplied to the first duct 161. Alternatively, an inlet of the first duct 161 is communicatingly connected with the air-conditioning case 181 of the upstream side of the evaporator 150 so that some of the air before passing the evaporator 150 in the air-conditioning case 181 can be supplied to the first duct 161.

In the above, the first duct 161 is connected to the air-conditioning case 181 or the air blast case 185, but, the air conditioner system according to the present invention can utilize all air discharged out of the air conditioner 180. For instance, the air conditioner system can utilize air discharged to a vehicle cool box or air discharged to a drain hole.

An outlet of the first duct 161 is connected with the rear of the air-cooled condenser 120.

Therefore, when the air blast fan 186 of the air conditioner 180 is operated, some of the air flowing inside the air conditioner 180 is supplied to the air-cooled condenser 120 through the first duct 161, so as to cool the refrigerant flowing in the air-cooled condenser 120 even though traveling wind becomes weaker like idling of the vehicle.

Moreover, the second duct 162 diverges from the first duct 161, and an inlet of the second duct 162 is connected with the cowl 126 of the vehicle.

Therefore, outdoor air (traveling wind) induced into the cowl 126 is supplied to the air-cooled condenser 120 through the second duct 162 and heat-exchanges the refrigerant flowing in the air-cooled condenser 120.

Additionally, an actuator (not shown) for operating the door 163 by control of a controller (not shown) is mounted at one side of the door 163.

At the time of idling of the vehicle, the controller controls the actuator in such a manner that the door 163 opens the first duct 161 so that the air inside the air conditioner 180 is supplied to the air-cooled condenser 120. When the vehicle travels, the controller controls the actuator in such a manner that the door 163 opens the second duct 162 so that outdoor air (traveling wind) is supplied to the air-cooled condenser 120.

At the time of idling of the vehicle, because cold air of the interior of the vehicle flows into the air conditioner 180 and is supplied to the air-cooled condenser 120 through the first duct 161, the air conditioner system according to the present invention can cool the refrigerant of the air-cooled condenser 120 with a small air volume so as to reduce a loss of air volume when the air conditioner 180 is operated.

Moreover, in a case that the refrigerant flowing in the air-cooled condenser 120 can be cooled by traveling wind, because the first duct 161 is shut not to use the air of the air conditioner 180, the air conditioner system according to the present invention can prevent a loss of air volume and deterioration in cooling performance.

Meanwhile, the controller carries out control to increase voltage supplied to the air blast fan 186 to compensate a loss of air volume of the air conditioner 180 occurring when the door 163 opens the first duct 161 at the time of idling of the vehicle.

In other words, when the door 163 opens the first duct 161 to supply some of the air of the air conditioner 180 to the air-cooled condenser 120, the controller to apply +α voltage to operating voltage of the air blast fan 186 in consideration of the air volume discharged to the air-cooled condenser 120, so that there is no change in air volume discharged to the interior of the vehicle through the air conditioner 180 even though the first duct 16 is opened.

As described above, when traveling wind becomes weaker like idling of the vehicle, the air supply means 160 is operated to supply cold interior air to the air-cooled condenser 120. Because the refrigerant is cooled when the cold interior air is supplied to the air-cooled condenser 120, temperature of the refrigerant lowers more, and so, the air conditioner system can further enhance cooling performance.

Additionally, beside the water-cooled condenser 110, the air-cooled condenser 120 is mounted to further cool the refrigerant. When the cold interior air is supplied to the air-cooled condenser 120 through the air supply means 160 to lower temperature of the refrigerant, temperature of the refrigerant flowing into the compressor 100 lowers, and it prevents temperature rise of the refrigerant discharged from the compressor 100 and enhances durability and stability of the air conditioner system.

Figure 11:
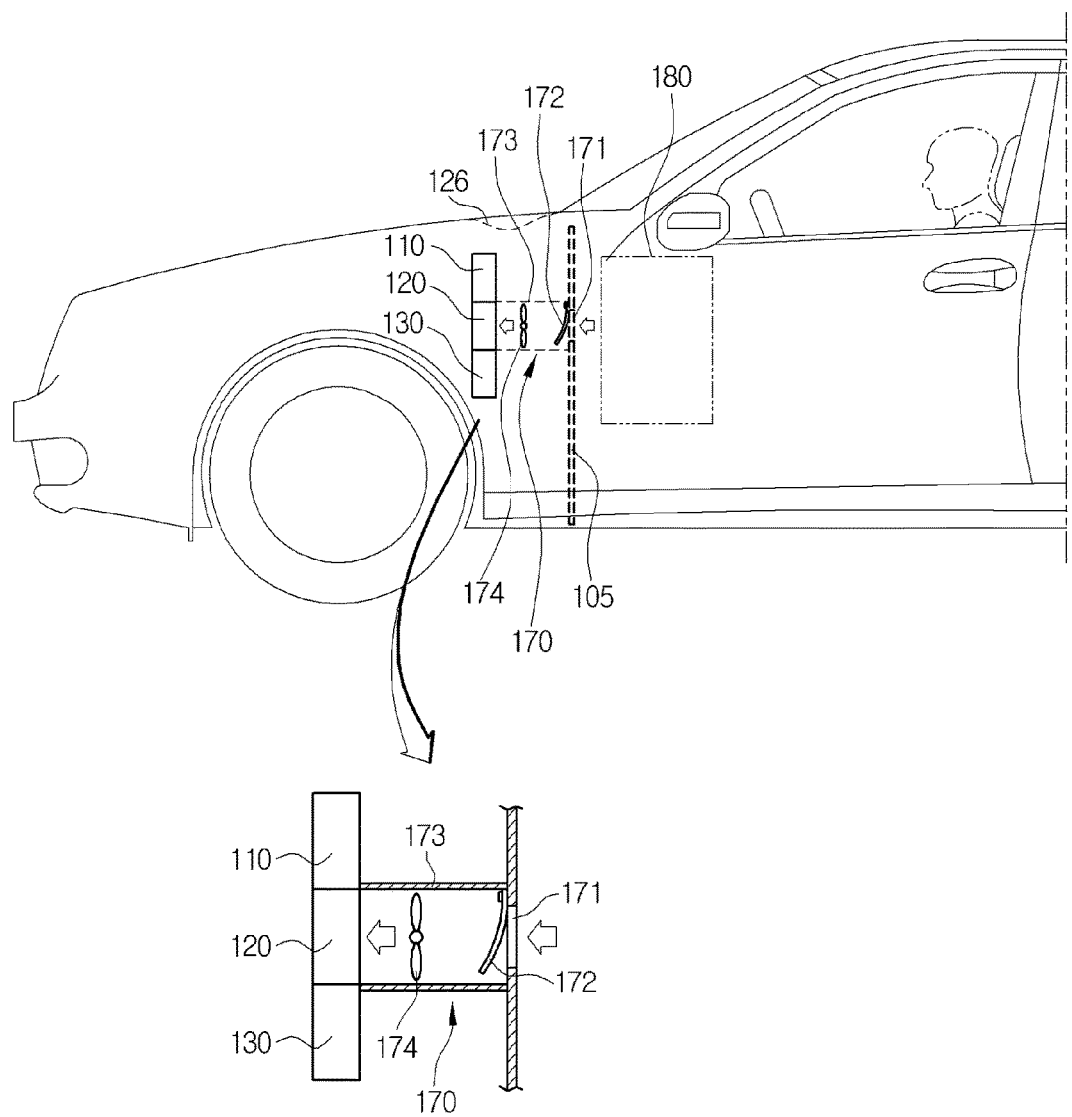
FIG. 11 is a schematic diagram showing a state where air supply means of the air conditioner system for the vehicle according to another embodiment of the present invention is mounted in the vehicle.
Figure 12:
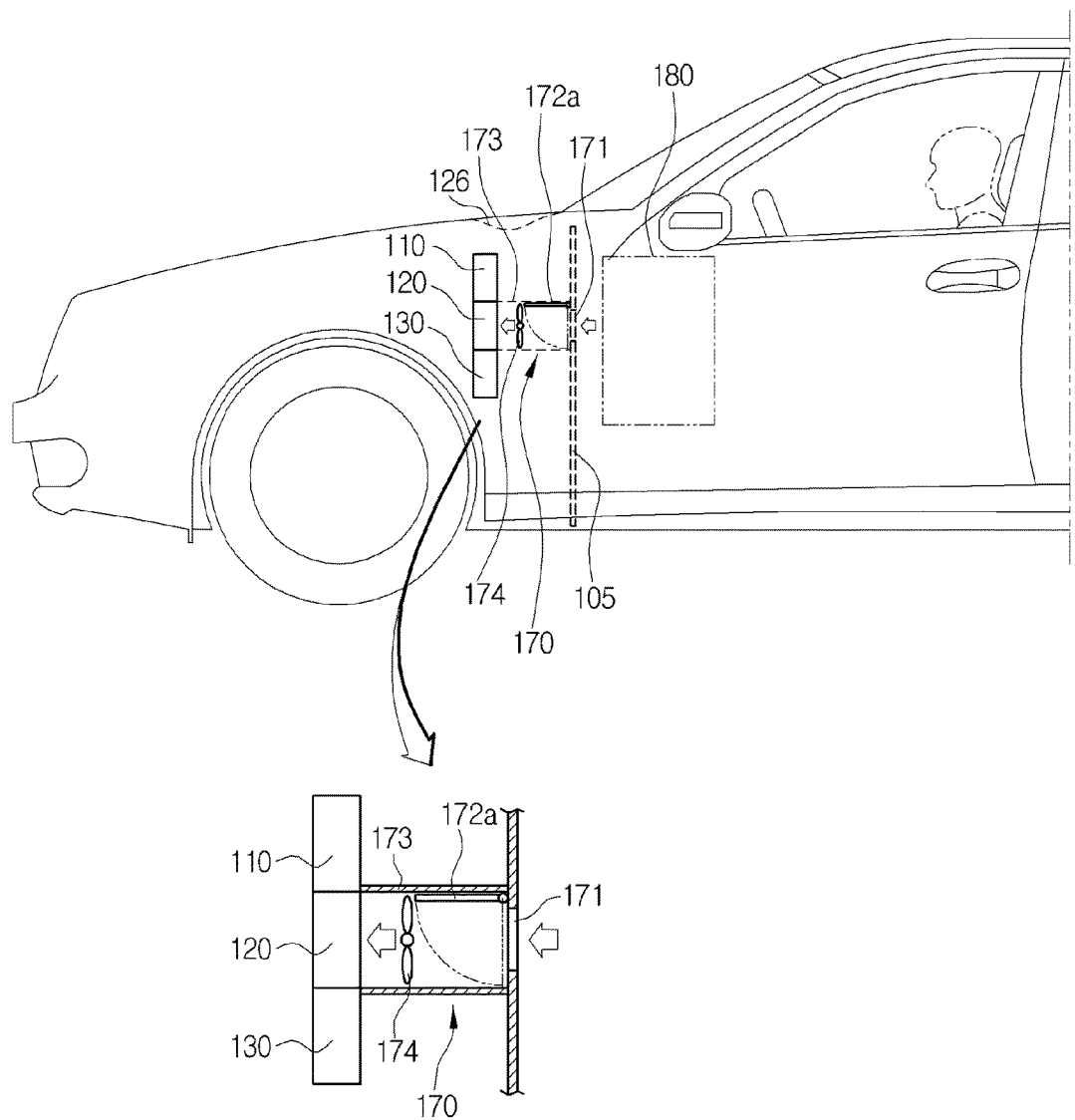
FIG. 12 is a view showing another example of a door in the air supply means of FIG. 11.

Moreover, as another embodiment of the air supply means, as shown in FIGS. 11 and 12, the air supply means 170 includes: an air supply hole 171 which penetrates through the partition wall 105 partitioning the vehicle engine room from the interior of the vehicle; a guide duct 173 which connects the air supply hole 171 with the air-cooled condenser 120 to guide the vehicle interior air supplied through the air supply hole 171 toward the air-cooled condenser 120; a door 172 or 172a which is mounted at one side of the air supply hole 171 to open and shut the air supply hole 171; and a fan 174 which is mounted inside the guide duct 173 to forcedly blow the vehicle interior air supplied through the air supply hole 171 to the air-cooled condenser 120.

While the vehicle travels, the air-cooled condenser 120 is cooled using traveling wind induced into the engine room or using traveling wind induced through the cowl 126, but only under the condition that traveling wind becomes weaker like idling of the vehicle, the fan 174 is operated to forcedly blow the vehicle interior air to the air-cooled condenser 120.

The doors 172 and 172a may have two types.

First, the door 172 is made of an elastic material. As shown in FIG. 11, one end portion of the door 172 is joined to one end portion of the air supply hole 171, and the other end portion of the door 172 shuts the air supply hole 171 when the fan 174 is not in operation and opens the air supply hole 171 while elastically moving when the fan 174 is operated.

In other words, when the fan 174 is operated, the door 172 which is made with the elastic material opens the air supply hole 171 by negative pressure, and in this instance, the vehicle interior air inhaled through the air supply hole 171 is supplied to the air-cooled condenser 120 through the guide duct 173.

Second, as shown in FIG. 12, the door 172a is rotatably mounted at one side of the air supply hole 171 and an actuator (not shown) is mounted at one side of the door 172a. So, when the fan 174 is not in operation, the door 172a shuts the air supply hole 171 by operation of the actuator, and when the fan 174 is operated, the door 172a opens the air supply hole 171.

Therefore, when traveling wind becomes weaker like idling of the vehicle, the fan 174 is operated. Because the air supply hole 171 is opened by the door 172a to cool the air-cooled condenser 120 using the vehicle interior air only when the fan 174 is operated, it minimizes a rise of the vehicle interior temperature.

Furthermore, because the air-cooled condenser 120 is cooled using the cold interior air inhaled through the air supply hole 171, temperature of the refrigerant flowing into the internal heat exchanger 130 becomes lower, and it causes improvement of cooling performance.

Additionally, the air conditioner system according to the present invention operates the air supply means in the condition that the vehicle idles or traveling wind is reduced in order to supply cold interior air to the air-cooled condenser, thereby making stable air supply possible and securing uniform refrigerant cooling performance.

Hereinafter, an operation of the air conditioner system for the vehicle according to the present invention will be described.

First, the gas-phase refrigerant of high-temperature and high-pressure compressed and discharged in the compressor 100 flows into the refrigerant heat-exchanging part 111 of the water-cooled condenser 110.

The gas-phase refrigerant flowing into the refrigerant heat-exchanging part 111 of the water-cooled condenser 110 exchanges heat with coolant flowing into the coolant heat-exchanging part 112 of the water-cooled condenser 110 while circulating in the water-cooled radiator 200, and in the above process, the refrigerant is cooled and changed into a liquid state.

The liquid-phase refrigerant discharged from the water-cooled condenser 110 flows into the air-cooled condenser 120 and is further cooled (supercooled) through heat exchange with air, and then, flows into the internal heat exchanger 130.

The refrigerant flowing into the internal heat exchanger 130 is further cooled while exchanging heat with the refrigerant flowing in the internal heat exchanger 130, and then, flows into the expansion valve 140 to be decompressed and expanded.

The refrigerant decompressed and expanded in the expansion valve 140 becomes into an atomized state of low-temperature and low-pressure and flows into the evaporator 150. The refrigerant flowing into the evaporator 150 is evaporated through heat exchange with the air blown to the interior of the vehicle, and at the same time, cools the air blown to the interior of the vehicle due to heat absorption due to evaporative latent heat of the refrigerant.

After that, the refrigerant of low-temperature and low-pressure discharged from the evaporator 150 flows into the internal heat exchanger 130. In this instance, the refrigerant exchanges heat with the refrigerant which is discharged from the air-cooled condenser 120 and flows in the internal heat exchanger 130. After that, the refrigerant flows into the compressor 100, and then, recirculates the refrigeration cycle as described above.

In the above process, the air-cooled condenser 120 is cooled using traveling wind induced into the engine room or using traveling wind induced through the cowl 126 while the vehicle travels. Under the condition that traveling wind becomes weaker like idling of the vehicle, the air supply means 160 or 170 is operated to cool the air-cooled condenser 120 by supplying the cold interior air to the air-cooled condenser 120.

The invention claimed is:

1. An air conditioner system for a vehicle which comprises:
   a compressor;

a water-cooled condenser for condensing refrigerant, which is compressed in and discharged from the compressor, by exchanging heat with coolant;
an expansion valve adapted for expanding the refrigerant discharged from the water-cooled condenser;
an evaporator for evaporating the refrigerant discharged from the expansion valve;
a refrigeration pipe for connecting the compressor, the water-cooled condenser, the expansion valve and the evaporator with one another in order; and
an air-cooled condenser which is mounted between the water-cooled condenser and the expansion valve in order to further cool the refrigerant by exchanging heat between the refrigerant discharged from the water-cooled condenser with air;
wherein an air supply means is mounted at one side of the air-cooled condenser and connects the air-cooled condenser to an air conditioner to supply air from the air conditioner to the air-cooled condenser.

2. The air conditioner system according to claim 1, further comprising:
an internal heat exchanger mounted between the air-cooled condenser and the expansion valve in order to exchange heat between the refrigerant discharged from the air-cooled condenser and refrigerant discharged from the evaporator.

3. The air conditioner system according to claim 2, wherein the water-cooled condenser, the air-cooled condenser and the internal heat exchanger are mounted inside an engine room of the vehicle in such a way as to be mounted adjacent to a partition wall which partitions the engine room from the interior of the vehicle.

4. The air conditioner system according to claim 3, wherein the water-cooled condenser, the air-cooled condenser and the internal heat exchanger are connected with one another in line.

5. The air conditioner system according to claim 3, wherein a guide duct is mounted at the front of the air-cooled condenser to guide air toward the air-cooled condenser.

6. The air conditioner system according to claim 1, wherein the water-cooled condenser comprises: a refrigerant heat-exchanging part in which the refrigerant discharged from the compressor flows; and a coolant heat-exchanging part in which coolant circulating a water-cooled radiator mounted inside the engine room flows, and the refrigerant heat-exchanging part and the coolant heat-exchanging part are configured to be able to exchange heat with each other.

7. The air conditioner system according to claim 1, wherein the air supply means comprises:
a first duct which connects the air-cooled condenser and the air conditioner of the vehicle with each other to supply the air inside the air conditioner to the air-cooled condenser;
a second duct which connects the first duct with the exterior of the vehicle to supply outdoor air to the air-cooled condenser; and
a door which is mounted at a diverging point between the first duct and the second duct to open and shut the first duct and the second duct.

8. The air conditioner system according to claim 7, wherein the air conditioner comprises: an air-conditioning case in which the evaporator and a heater core are mounted; and an air blast case which is connected to one side of the air-conditioning case and has an air blast fan for blowing air toward the air-conditioning case, and
wherein an inlet of the first duct is communicatingly connected with the air blast case so that some of the air flowing in the air blast case is supplied to the first duct.

9. The air conditioner system according to claim 7, wherein the air conditioner comprises: an air-conditioning case in which the evaporator and a heater core are mounted; and an air blast case which is connected to one side of the air-conditioning case and has an air blast fan for blowing air toward the air-conditioning case, and
wherein an inlet of the first duct is communicatingly connected with the air-conditioning case of the upstream side of the evaporator so that some of the air before passing the evaporator inside the air-conditioning case is supplied to the first duct.

10. The air conditioner system according to claim 9, wherein an actuator is mounted at one side of the door to operate the door through control of a controller, and
wherein the controller controls the actuator in such a manner that the door opens the first duct at the time of idling of the vehicle so that the air inside the air conditioner is supplied to the air-cooled condenser, and controls the actuator in such a manner that the door opens the second duct when the vehicle travels so that outdoor air (traveling wind) is supplied to the air-cooled condenser.

11. The air conditioner system according to claim 10, wherein the controller carries out control to increase voltage supplied to the air blast fan in order to compensate a loss of air volume of the air conditioner occurring when the door opens the first duct at the time of idling of the vehicle.

12. The air conditioner system according to claim 1, wherein the air supply means comprises:
an air supply hole which penetrates through the partition wall partitioning the vehicle engine room from the interior of the vehicle;
a guide duct which connects the air supply hole with the air-cooled condenser to guide the vehicle interior air supplied through the air supply hole toward the air-cooled condenser;
a door which is mounted at one side of the air supply hole to open and shut the air supply hole; and
a fan which is mounted inside the guide duct to forcedly blow the vehicle interior air supplied through the air supply hole to the air-cooled condenser.

13. The air conditioner system according to claim 12, wherein the door is made with an elastic material, and one end portion of the door is joined to one end portion of the air supply hole and the other end portion shuts the air supply hole when the fan is not in operation and opens the air supply hole while elastically moving when the fan is operated.

14. The air conditioner system according to claim 12, wherein the door is rotatably mounted at one side of the air supply hole, and
wherein an actuator is mounted at one side of the door, and the door shuts the air supply hole by operation of the actuator when the fan is not in operation, but opens the air supply hole and when the fan is operated.

\* \* \* \* \*